(12) United States Patent
Camps Mur et al.

(10) Patent No.: US 9,100,977 B2
(45) Date of Patent: Aug. 4, 2015

(54) METHOD FOR OPERATING A WIRELESS TERMINAL AS AN ACCESS POINT AND WIRELESS TERMINAL

(75) Inventors: Daniel Camps Mur, Darmstadt (DE); Xavier Perez Costa, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 705 days.

(21) Appl. No.: 13/395,664

(22) PCT Filed: Jun. 28, 2010

(86) PCT No.: PCT/EP2010/003839
§ 371 (c)(1),
(2), (4) Date: Mar. 13, 2012

(87) PCT Pub. No.: WO2012/000522
PCT Pub. Date: Jan. 5, 2012

(65) Prior Publication Data
US 2012/0178429 A1 Jul. 12, 2012

(51) Int. Cl.
*H04B 7/185* (2006.01)
*H04W 72/12* (2009.01)
*H04W 88/04* (2009.01)
*H04W 88/06* (2009.01)
*H04W 88/10* (2009.01)

(52) U.S. Cl.
CPC .......... *H04W 72/1215* (2013.01); *H04W 88/04* (2013.01); *H04W 88/06* (2013.01); *H04W 88/10* (2013.01)

(58) Field of Classification Search
USPC ................................................ 455/11.1, 13.4
See application file for complete search history.

(56) References Cited

U.S. PATENT DOCUMENTS

| 7,436,790 | B2 | 10/2008 | Todd et al. | |
| 7,505,735 | B2 | 3/2009 | Miyoshi | |
| 8,391,260 | B1 * | 3/2013 | Kopikare et al. | 370/338 |
| 2005/0117530 | A1 | 6/2005 | Abraham et al. | |
| 2005/0221869 | A1 | 10/2005 | Liu et al. | |
| 2011/0158115 | A1 * | 6/2011 | Sun et al. | 370/252 |

FOREIGN PATENT DOCUMENTS

| JP | 2010-021878 A | 1/2010 |
| WO | 2005088867 A1 | 9/2005 |
| WO | 2007/013934 | 2/2007 |

OTHER PUBLICATIONS

Japanese Office Action, dated Nov. 21, 2012, from corresponding JP application.

(Continued)

*Primary Examiner* — Justin Lee
(74) *Attorney, Agent, or Firm* — Young & Thompson

(57) ABSTRACT

A method for operating a wireless terminal as an access point—access point terminal (2)—that connects a set of one or more client terminals (4) to an external network, wherein a schedule of absence periods is established during which the connected client terminals (4) are not allowed to transmit data to the access point terminal (2), wherein the absence periods together with corresponding presence periods are scheduled at regular intervals and have certain durations, is characterized in that an adaptation of the absence/presence periods' duration and/or interval parameters is executed on the basis of the bandwidth available in the external network and the amount of traffic transmitted between the access point terminal (2) and the connected client terminals (4). Furthermore, a corresponding wireless terminal is disclosed.

16 Claims, 6 Drawing Sheets

(56) References Cited

OTHER PUBLICATIONS

International Search Report dated Mar. 28, 2011, corresponding to PCT/EP2010/003839.

Wi-Fi Alliance Technical Committee P2P Task Group; "Wi-Fi Peer-toPeer (P2P) Technical Specification"; Wi-Fi Alliance, Jan. 1, 2009; pp. 1, 48-52.

Saifullah et al.; "Sleep Mode With RS"; Nov. 26, 2007; p. 3.

* cited by examiner

METHOD FOR OPERATING A WIRELESS TERMINAL AS AN ACCESS POINT AND WIRELESS TERMINAL

BACKGROUND OF THE INVENTION

The present invention relates to a method for operating a wireless terminal as an access point—access point terminal—that connects a set of one or more client terminals to an external network, wherein a schedule of absence periods is established during which said connected client terminals are not allowed to transmit data to said access point terminal, wherein the absence periods together with corresponding presence periods are scheduled at regular intervals and have certain durations.

Furthermore, the present invention relates to a wireless terminal being operated as an access point—access point terminal—that connects a set of one or more client terminals to an external network, wherein said access point terminal is enabled to establish a schedule of absence periods during which said connected clients are not allowed to transmit data to said access point terminal, wherein the absence periods together with corresponding presence periods are scheduled at regular intervals and have certain durations.

In recent years it has become commonly known to operate wireless or handheld devices, like e.g. mobile phones, laptops, cameras or tablets, in such a way that they act as access point for other devices—client terminals—providing them with access to an external network. A typical application scenario would be, for instance, a mobile phone being equipped with a 3G interface and a Wi-Fi interface. In this scenario, the mobile phone may act as an access point in the Wi-Fi network and may give access to the 3G network to the attached Wi-Fi clients.

In contrast to conventional stationary base stations, which are noncritical in terms of energy supply as they are constantly plugged to the power, in the case of wireless terminals the problem arises that they are typically battery-powered and, acting as access points, quickly drains the batteries of the devices. Therefore, all such devices need to be power efficient when acting as APs. However, setting a wireless terminal that acts as access point, e.g. as Wi-Fi AP, into a sleep state in order to save power, comes along with the risk of causing degradation on the QoS experienced by the connected clients.

As a relevant prior art approach there is the P2P Technical Specification developed by the Wi-Fi Alliance, which is marketed under the name Wi-Fi Direct and which is expected to be launched in the second half of 2010 (see for reference Wi-Fi Alliance Technical Committee, P2P Technical Group, "Wi-Fi Peer-to-Peer (P2P) Technical Specification v1.0". Section 3.3.3.2 "P2P Group Owner Notice of Absence Procedure"). The new Wi-Fi Direct technology enables easy device to device connectivity using the Soft-AP concept. In this context Soft-AP denotes a device that implements a dual STA/AP stack.

The specification defines a power saving protocol that allows a Wi-Fi AP to save power [1, section 3.3.3.2]. The power saving protocol is named "Notice of Absence (NoA)", and it allows an AP to establish an absence schedule where the associated clients can not transmit in the network. The established absence periods can thus be used by the Wi-Fi AP to save power. However, although the P2P Technical specification defines the signaling protocol required to achieve power saving in a Wi-Fi AP, it does not define how such an absence schedule has to be built.

Another approach for reduced power consumption in a wireless access point is described in U.S. Pat. No. 7,436,790 B2. The major contribution of this work is a method to save power in a Wi-Fi AP by means of using "Contention Free Periods (CFPs)". CFPs are another signaling mechanism defined in the 802.11 standard. However, this mechanism is far less flexible than the NoA protocol discussed above, because a CFP can only signal a single absence period between two beacons. In addition, the CFP mechanism is not widely deployed in the market.

It is therefore an object of the present invention to improve and further develop a method and a wireless terminal of the initially described type in such a way that, by employing mechanisms that are readily to implement, an efficient and flexible power saving is achieved for the wireless access point without significantly degrading the performance and QoS experienced by the connected client terminals.

BRIEF SUMMARY OF THE INVENTION

In accordance with the invention, the aforementioned object is accomplished by a method comprising the features of claim 1. According to this claim, such a method is characterized in that an adaptation of the absence/presence periods' duration and/or interval parameters is executed on the basis of the bandwidth available in said external network and the amount of traffic transmitted between said access point terminal and said connected client terminals.

Furthermore, the aforementioned object is accomplished by a wireless terminal comprising the features of claim 17. According to this claim, such a method is characterized in that said access point terminal is configured to execute an adaptation of the absence/presence periods' duration and/or interval parameters on the basis of the bandwidth available in said external network and the amount of traffic transmitted between said access point terminal and said connected client terminals.

According to the invention it has first been recognized that in most use cases where an access point terminal provides external connectivity, the bottleneck is the link to the external network, e.g. a 3G link. The present invention takes advantage of the fact that the bandwidth of the network technology that connects the client terminals with the access point terminal is typically larger than the external network bandwidth, and it draws the conclusion that, as a consequence, it should be possible to switch off the radio in the access point terminal for some periods, without affecting the performance experienced by the client terminals. More specifically, the invention proposes to take into consideration at least the external network bandwidth and the bandwidth of the "internal" network (consisting of the access point terminal and the client terminals) for executing a dynamic adaptation of the absence/presence periods' duration and/or interval parameters. By doing so, an optimal QoS/energy trade-off can be obtained.

As a result, the method according to the present invention enables a wireless access point to save energy while minimizing the degradation introduced in the QoS performance of its connected clients. Furthermore, the present invention allows configuring a set of operating parameters, e.g. minimum and maximum absence/presence period durations and intervals, that allow to trade-off QoS and power consumption. Consequently, the present invention enables the intensive use of, e.g., a mobile phone as a wireless access point or mobile hot spot.

According to a preferred embodiment the access point terminal may be operated as a Wi-Fi Direct device acting as access point (or P2P Group Owner in Wi-Fi Direct terminology). This means that the access point terminal would be equipped with a Wi-Fi interface to communicate with associated client terminals that together with the access point terminal would constitute a P2P group. The prevalence of the Wi-Fi technology is steadily growing and it has the advantage of being rather flexible due to its good interoperability. However, as will be apparent to persons skilled in the art, the access point terminal may incorporate another wireless communication technology, like for instance Bluetooth, in order to provide associated client terminals access to an external network.

According to a further preferred embodiment the access point terminal is a mobile phone, and the external network is a wide area network, in particular a 3G network, a WiMAX network (according to the IEEE 802.16 and 802.16m standards), or an LTE or LTE Advanced network. In such implementation, for instance in case of the external network being a 3G network, the mobile phone would be equipped with a 3G interface and an additional interface, e.g. a Wi-Fi interface, in order to give attached Wi-Fi clients access to the 3G network. In addition, the method can also be implemented in any other wireless technology where the "access point/base station/femtocell" provides connectivity to an external network and can advertise an absence/presence schedule to its associated clients. 802.16m is, at the time of writing, discussing a similar technology for femtocells named "Low Duty Mode". LTE and LTE-Advanced might be other candidate technologies where the proposed invention could be applicable.

In case of the access point terminal being operated as a Wi-Fi access point, it proves to be particularly advantageous to establish the schedule of absence/presence periods in form of the Wi-Fi Direct Notice of Absence (NoA) power saving protocol. The "Notice of Absence (NoA)" power saving protocol is described in the specification of the Wi-Fi Alliance Technical Committee, P2P Technical Group, "Wi-Fi Peer-to-Peer (P2P) Technical Specification v1.0", Section 3.3.3.2 "P2P Group Owner Notice of Absence Procedure", and it allows an AP to establish an absence schedule where the associated clients can not transmit in the network. The established absence periods can thus be used by the Wi-Fi AP to save power. According to the specification an absence schedule is defined by the 4-tuple "start time/duration/interval/count". It is to be noted that although the NoA protocol establishes an "absence" schedule, where absence periods are scheduled at regular intervals and have certain durations, one could also talk about a "presence" schedule, where presence periods are simply signaled as the times between absence intervals. Consequently, throughout the present application use is made of both terms "absence" and "presence" schedule depending on the particular context.

Advantageously the access point terminal is configured to publicly advertise a schedule of absence/presence periods that is defined at least by the duration and the interval of absence/presence periods. By doing so, the associated client terminals are permanently informed about the access point terminal's activities, and they are enabled to schedule their own activities accordingly. As an appropriate signaling protocol for advertising a schedule of absence/presence periods one can consider the protocol that is included in the above mentioned P2P technical specification, which is expected to be widely deployed.

Information on the bandwidth available in the external network may be obtained in different ways. For instance, it may be provided that a bandwidth that would be expected under certain circumstances and conditions is taken as reference for the adaptation process. Moreover, the bandwidth may be estimated, wherein the estimation could be based on various inputs and/or external information, as well as on specific constants, formulas, etc. Alternatively or additionally, according to a specific embodiment the access point terminal is configured to measure the bandwidth available in the external network, i.e. for instance in the 3G network in the case of the access point terminal being a mobile phone. Several methods may be applied to perform such measurements. For instance, in the case of a mobile phone, one possibility would be to implement an interface between the 3G and the Wi-Fi drivers (i.e. at layer 2), so that the 3G driver informs the Wi-Fi driver about the available bandwidth. Another possibility would be to define active/passive measurement algorithms that estimate the bandwidth available in the 3G network, for instance sending probe packets (e.g. packet pairs), or measuring the interarrival times between packets at the Wi-Fi driver.

In order to gather all information required for dynamically adjusting the duration and/or the interval parameters of the absence/presence periods, a method to measure the amount of traffic flowing between the external network and the wireless network has to be established. This can be also easily implemented in the access point terminal itself measuring the amount of traffic forwarded between the external network and the client terminals connected to the access point terminal.

According to a specific embodiment the duration of the absence/presence periods advertised by the wireless access point may be adjusted according to the previous measurements in the following way: For instance, in the case of a mobile phone, if the amount of traffic flowing between the 3G network and the Wi-Fi network is below the amount of bandwidth available in the 3G network, the Wi-Fi AP may increase the duration of its presence periods (or decrease the duration of its absence periods). On the other hand, if the amount of traffic flowing through the Wi-Fi AP matches (or is reasonably close to) the amount of bandwidth available in the 3G network, the Wi-Fi AP may decrease the duration of its presence periods (or increase the duration of its absence periods). The specific conditions may be defined by employing configurable threshold values. In the latter scenario the data connection (typically over TCP) saturates in the 3G base station. Therefore, it is possible that the Wi-Fi AP decreases the duration of its presence periods (or increases the duration its absence periods) in order to save energy, without affecting the end to end performance of the data connection.

Alternatively or additionally, the same mechanism as described above with respect to the absence/presence periods' duration may be applied to adjust the interval between the absence/presence periods advertised by the wireless access point according to the previous measurements. For instance, in the case of a mobile phone, if the amount of traffic flowing between the 3G network and the Wi-Fi network is below the amount of bandwidth available in the 3G network, the Wi-Fi AP may decrease the interval between absence/presence periods in order to be present more often. On the other hand, if the amount of traffic flowing through the Wi-Fi AP matches (or is reasonably close to) the amount of bandwidth available in the 3G network, the Wi-Fi AP may increase the interval between absence/presence periods.

With respect to further optimization it may be provided to establish an appropriate power saving schedule if applications cannot offer enough traffic to match the bandwidth available in the external network. For instance, applications like Web, might not be able to fully utilize the bandwidth offered by the external network. Therefore, a mechanism is advantageous in the access point terminal to avoid setting too large presence period durations (or too short absence period durations) or too short absence/presence period intervals, in the case that applications do not offer enough load to utilize all the bandwidth available in the external network. A possible implementation of this mechanism would be to measure how the amount of traffic flowing through the access point terminal reacts to changes in the power saving schedule.

According to an advantageous embodiment a set of parameters may be defined to allow an implementer to trade-off QoS performance with power consumption according to its particular needs. For instance, an implementation could adapt the duration of absence/presence periods between a minimum duration (min_duration, e.g 10 ms) and a maximum duration (max_duration, e.g. 100 ms), and the interval between absence/presence periods between a minimum interval length (min_interval, e.g. 20 ms) and a maximum interval length (max interval, e.g. 100 ms). With respect to an enhanced flexibility it may be provided to introduce another parameter, which is the percentage of bandwidth available in the external network that the access point terminal wants to provide to its connected clients (e.g. 80%). This parameter can also be employed to trade-off QoS performance with power consumption. Manipulating these operating parameters, an implementer can lean towards a more energy conserving behavior or a more QoS oriented behavior in the wireless access point. These parameters could even be dynamically adjusted depending on the amount of battery power left in the access point terminal.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will we explained. In the drawing

DETAILED DESCRIPTION OF THE INVENTION

Figure 1:
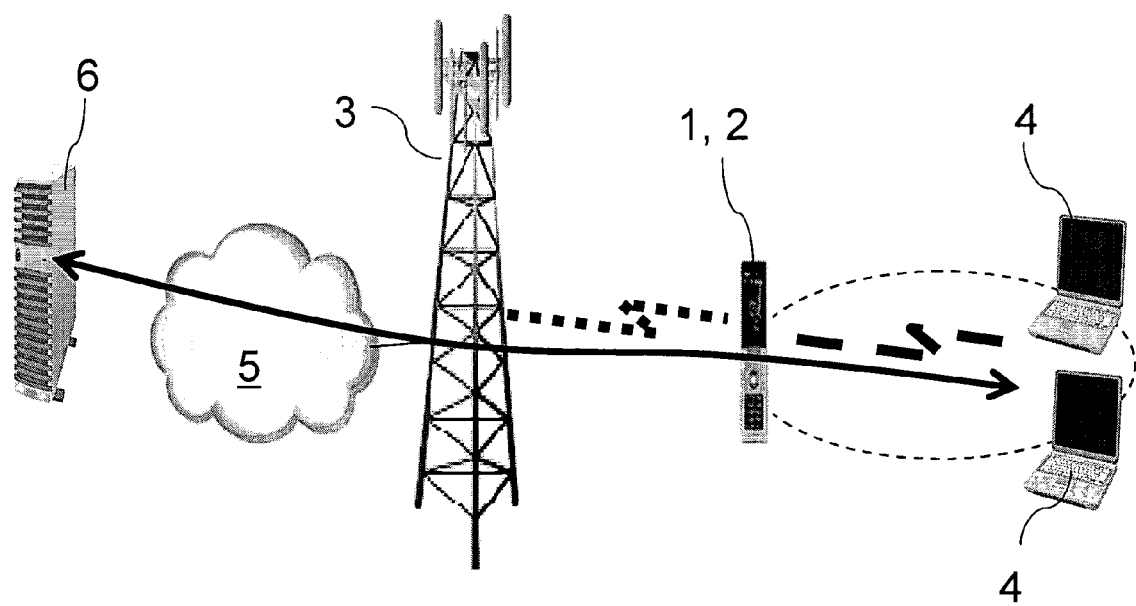
FIG. 1 is a schematic view of an application scenario of a method according to an embodiment of the present invention.

The possible application scenario depicted in FIG. 1 illustrates a mobile phone 1 that acts as a wireless access point terminal 2. The mobile phone 1 is equipped with a 3G interface in order to establish a wireless connection with a NodeB 3 and a Wi-Fi interface in order to give connected wireless Wi-Fi client terminals 4 access to the external network. In the embodiment of FIG. 1 the external network is assumed to be a 3G network 5. The 3G link established between Wi-Fi AP 2 and NodeB 3 is indicated by a dotted line, whereas the Wi-Fi link established between the Wi-Fi AP 2 and the Wi-Fi client terminals 4 is indicated by a dashed line.

In the illustrated embodiment the data connection (typically over TCP) from an application server 6 via the Wi-Fi AP 2 to the connected Wi-Fi client terminals 4, which in FIG. 1 is indicated by the solid line arrow, will likely saturate in the 3G link. Therefore, the maximum throughput that this connection will be able to obtain depends on the bandwidth available in the 3G link, which tends to be highly variable. In addition, it is fair to assume that the bandwidth available in the Wi-Fi network is above the bandwidth available in the 3G link (e.g. traditional 802.11g Wi-Fi networks can provide data rates of up to 54 Mbps, while the latest HSDPA deployments have peak rates of 7.2 Mbps). Given the previous mismatch between the data rates available in the 3G and the Wi-Fi networks, it should be theoretically possible to set the Wi-Fi AP 2 into sleep mode in order to save energy, without affecting the end to end performance of the data connection.

Figure 2:
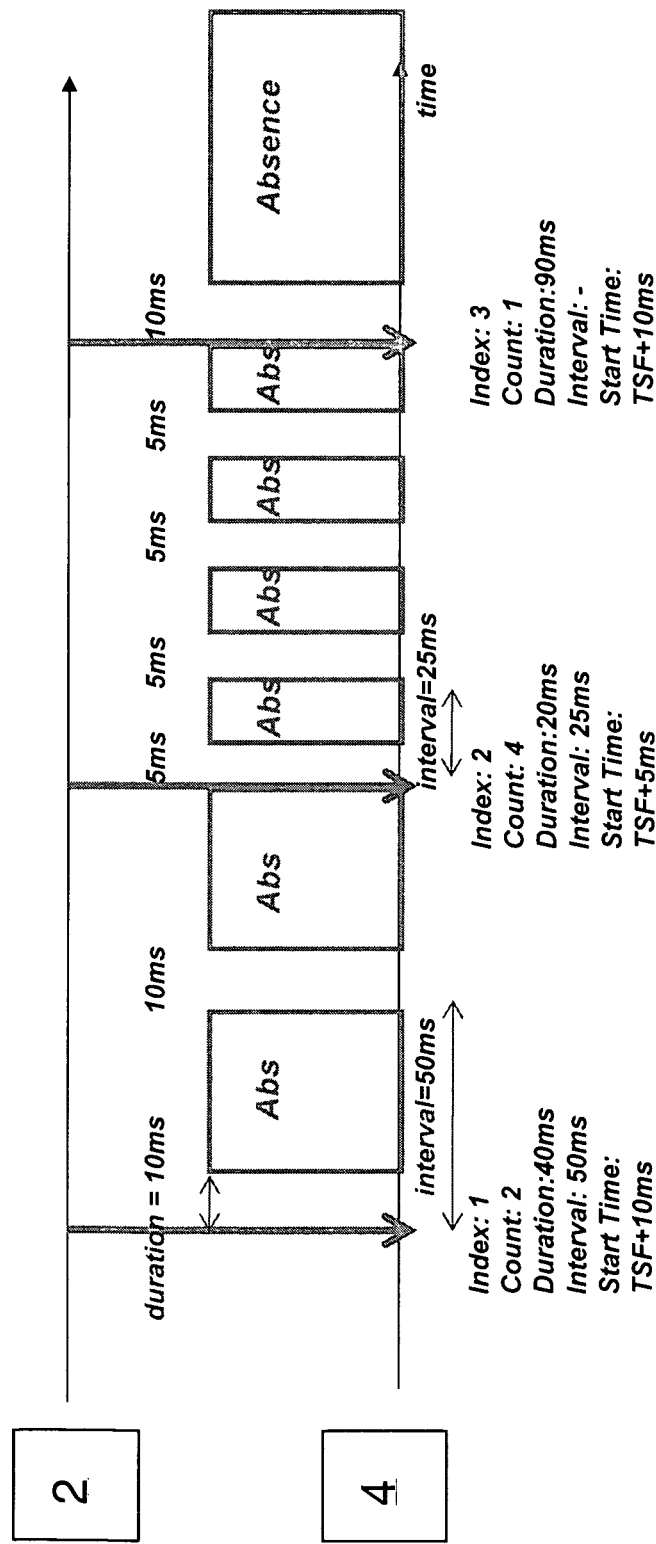
FIG. 2 is a schematic illustration of the power saving protocol "Notice of Absence (NoA)" as developed by the Wi-Fi Alliance.

FIG. 2 is a schematic illustration of the power saving protocol "Notice of Absence (NoA)" developed by the Wi-Fi Alliance, which is described in Wi-Fi Alliance Technical Committee, P2P Technical Group, "Wi-Fi Peer-to-Peer (P2P) Technical Specification v1.0", section 3.3.3.2 "P2P Group Owner Notice of Absence Procedure". According to the specification an absence schedule is defined by the 4-tuple "start time/duration/interval/count". In FIG. 2 like numerals are used for like components with respect to the embodiment of FIG. 1, and their detailed explanation is omitted.

As can be obtained from FIG. 2, the first illustrated beacon (vertical arrows) broadcasted by the Wi-Fi AP 2 and being received by one or more connected Wi-Fi client terminals 4, indicates with index 1 an NoA with two absence periods (count=2), each absence period having a duration of 40 ms, and the interval length being 50 ms. It is to be noted how this absence schedule implicitly signals a schedule of presence periods of duration 10 ms and interval 50 ms. The next beacon indicates a different NoA with changed parameters, the number of absence periods now being 4, with each absence period having a duration of 20 ms, and the interval being 50 ms. It is to be noted that in a periodic NoA (as illustrated in FIG. 2) the length of the absence/presence duration and interval between two beacons does not vary.

According to the present invention parameters that define a power saving schedule (e.g. an NoA or NoA-like power saving schedule) in a wireless access point terminal that provides access to an external network are dynamically adapted, in order to save energy in the access point terminal without affecting the end to end performance of the data connection to associated client terminals. The basic concept behind the proposed idea is that such power saving schedule is adapted according to the available bandwidth measured in the external network, and the amount of traffic transmitted in the wireless network. A detailed description of the concept is given by way of example in connection with the embodiment illustrated in FIG. 3.

Figure 3:
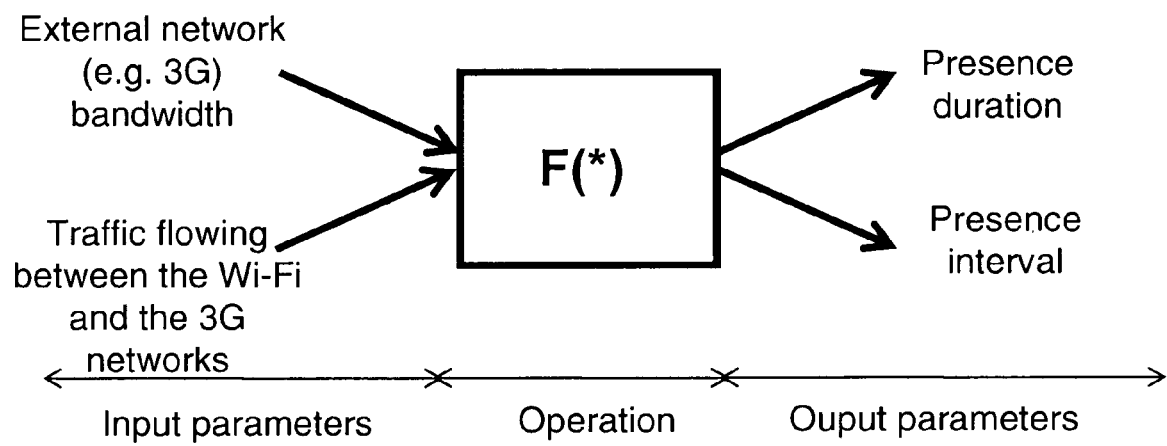
FIG. 3 is a schematic illustration of a power saving protocol adaptation mechanism according to an embodiment of the present invention.

As can be obtained from FIG. 3, the input parameters required for performing the power saving schedule adaptation mechanism according to the present invention at least include the external network bandwidth and the traffic flowing between the access point terminal and the associated client terminals. Both input parameters can be measured by the access point terminal itself. It is to be understood that in a more sophisticated implementation more input parameters than the above-mentioned ones can be taken into consideration.

In FIG. 3, the operation that is carried out on the basis of the input parameters is generally denoted F(*). In case of a mobile phone providing Wi-Fi client terminals access to a 3G network F(*) may be defined by the following basic rules:

1. If the 3G bandwidth increases, the absence/presence period interval may decrease and the presence period duration may increase (or absence period duration can decrease).
2. If 3G bandwidth decreases, the absence/presence period interval may increase and the presence period duration may decrease (or absence period duration may increase).
3. If the 3G↔Wi-Fi traffic increases, the absence/presence period interval may decrease and the presence period duration may increase (or absence period duration may decrease).
4. If the 3G↔Wi-Fi traffic decreases, the absence/presence period interval may increase and the presence period duration may decrease (or absence period duration may increase).
5. The previous rules can be combined when more than one happen at the same time.

It is to be noted that there are many possible specific implementations based on the previous general rules. For instance, if 3G bandwidth increases 10%, one could decrease the presence interval by 20% and increase the presence duration by 80%, or one could decrease the presence interval by 80% and increase the presence duration by 20%.

As already mentioned above, a possible embodiment of the present invention is to adjust both duration and interval at the same time. For instance, this can be realized in the following way:

1. Estimate the 3G bandwidth in the Wi-Fi AP driver (3 g_bw).
2. Measure the 3G↔Wi-Fi traffic (thr).
3. Define ratio=thr/3g_bw, then:
    If ratio<ratio_min, then decrease the absence/presence interval and/or increase the presence period duration (or decrease the absence period duration), according to a certain policy.
    If ratio>ratio_min, then increase the absence/presence interval and/or decrease the presence period duration (or increase the absence period duration), according to a certain policy.
In this context ratio_min denotes a threshold that can be configured by an implementer according to his actual interests and/or needs in order to optimally trade-off power consumption in the wireless AP with the QoS performance of its associated clients.
4. Define a mechanism to detect if the offered load is not enough and in that case increase the absence/presence period interval and/or decrease the presence period duration (or increase the absence period duration), according to a certain policy.

Figure 4:
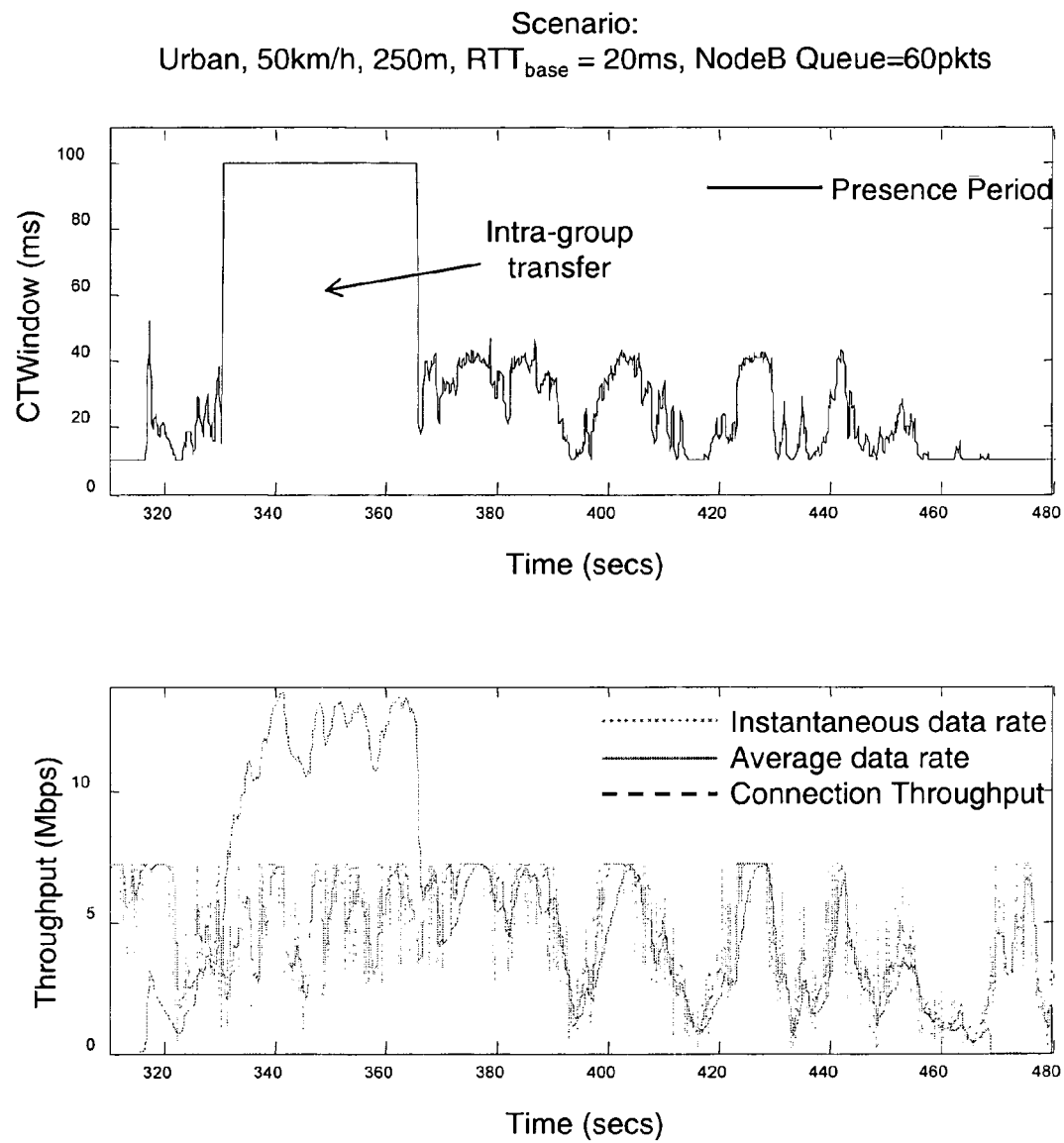
FIG. 4 is a diagram illustrating the behavior resulting from an adaptation of the duration of presence periods according to an embodiment of the present invention.

FIG. 4 illustrates the behavior resulting from an application of the method according to the present invention. In the presented example, a client terminal connected to the Wi-Fi AP retrieves a 50 MB file through the 3G network. The Wi-Fi AP adapts the duration of a single presence period per Beacon interval between 10 ms and 100 ms, according to the bandwidth available in the 3G network. When the bandwidth available in the 3G link decreases (solid and dotted lines in the lower diagram), the presence periods advertised by the Wi-Fi AP (line in the upper diagram) also decrease in order to save more energy. On the other hand, when the bandwidth available in the 3G network increases, the presence periods advertised by the Wi-Fi AP also increase in order to allow the connected clients to benefit from the bandwidth available in the 3G network. In this way, the Wi-Fi AP minimizes its energy consumption without affecting the throughput of the data transfer that is indicated by the dashed line in the lower diagram.

Figure 5:
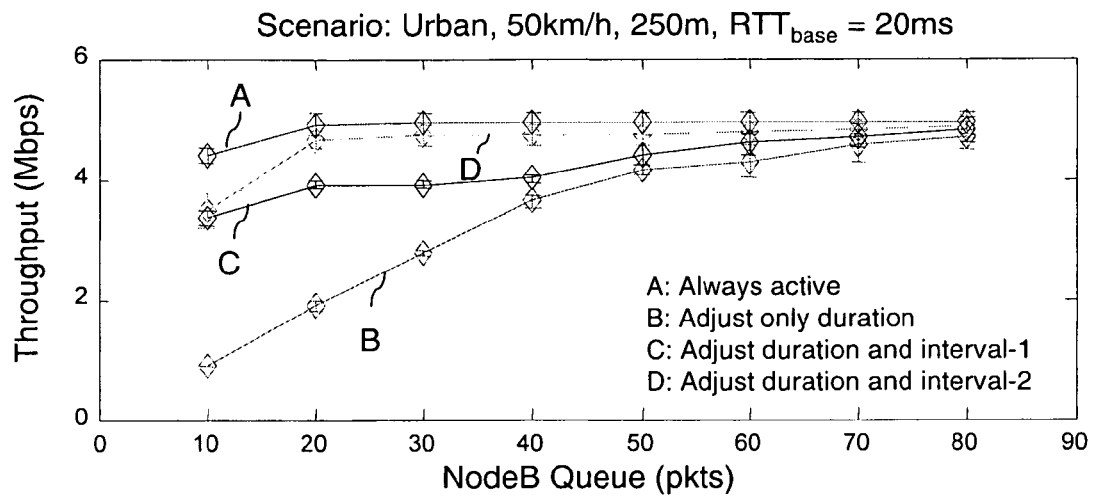
FIG. 5 is a diagram illustrating the benefits regarding throughput resulting from an adaptation of the duration and the interval of presence periods according to an embodiment of the present invention.
Figure 5:
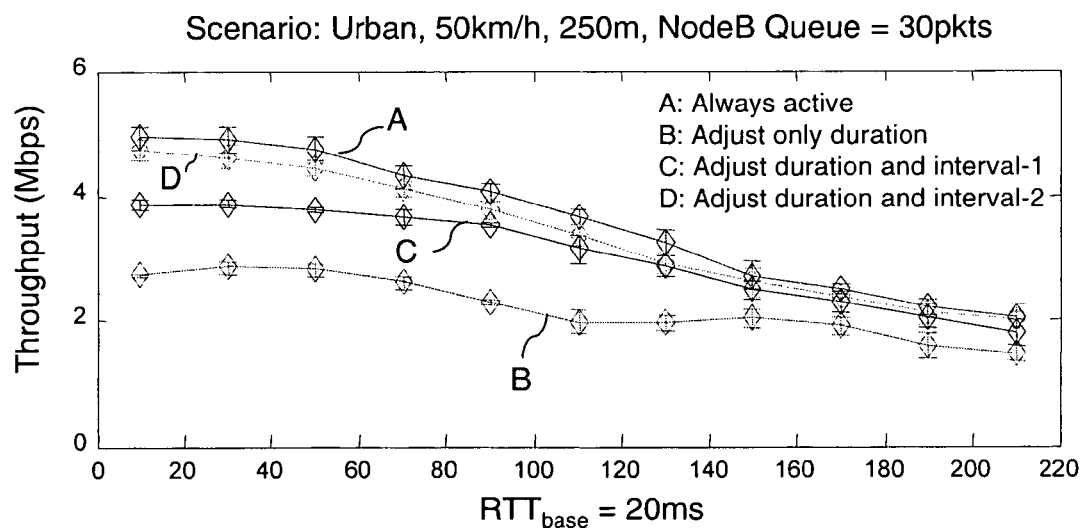
Figure 6:
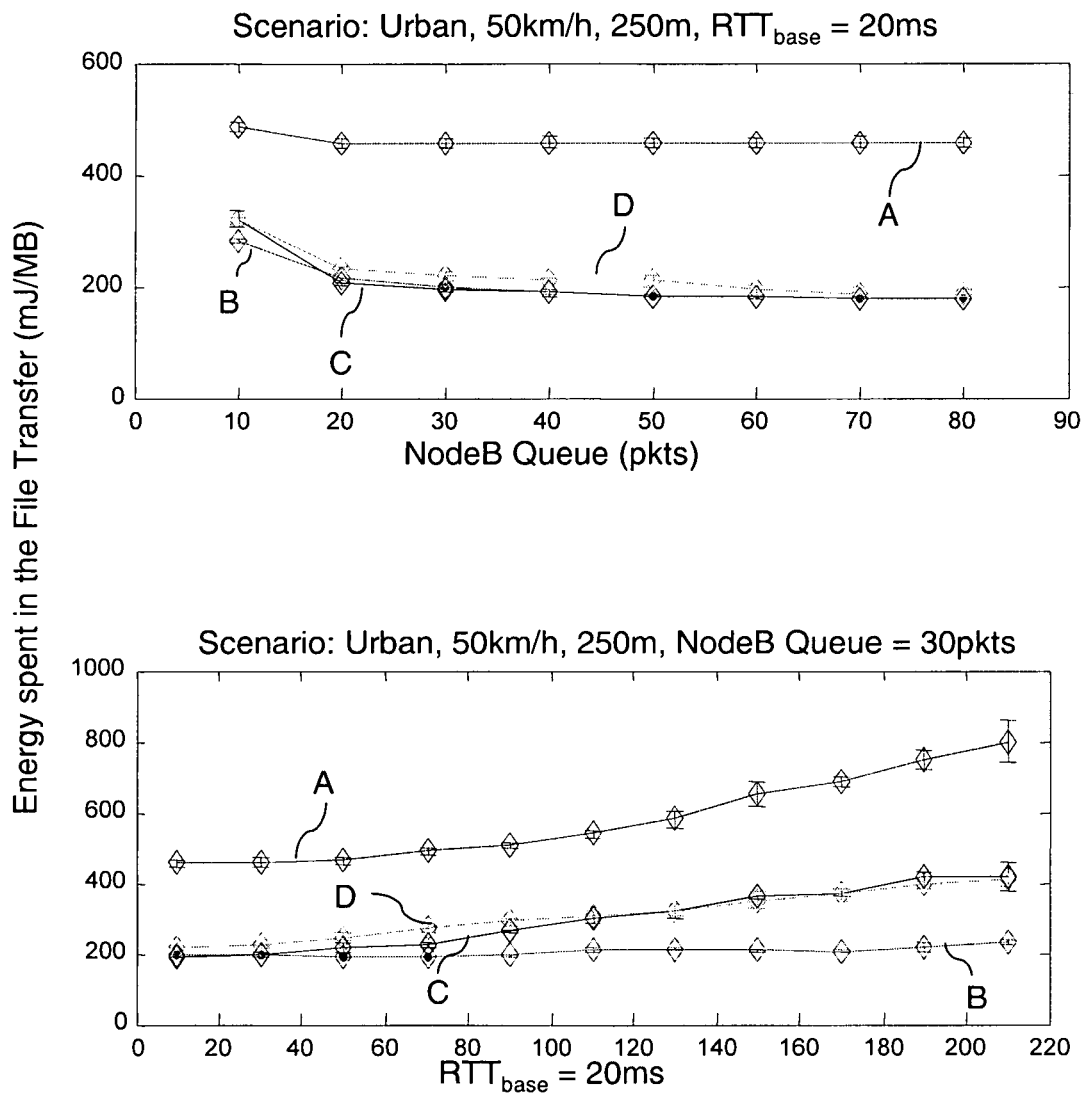
FIG. 6 is a diagram illustrating the benefits regarding energy saving resulting from an adaptation of the duration and the interval of presence periods according to an embodiment of the present invention.

An important aspect of the method according to the present invention is that both duration and interval parameters of the power saving schedule can be adjusted. To demonstrate the benefits resulting from this possibility the graphs illustrated in FIGS. 5 and 6 depict the results of an experiment where an adjustment of both duration and interval is compared to a method that only adjusts the duration of a single presence period every Beacon interval and to a method where the Wi-Fi AP is in active mode.

The experiment being performed is the following: A Wi-Fi client downloads a 50 MB file (e.g. a YouTube video) through the 3G network and the Wi-Fi AP using TCP. Several parameters of the connection (RTT (Round Trip Time) and available buffering) are modified, and performance is measured in terms of connection throughput (graphs illustrated in FIG. 5), and energy consumption in the Wi-Fi AP (graphs illustrated in FIG. 6).

If the Wi-Fi AP permanently stays in active mode (line A) during the duration of the file transfer, an optimum performance in terms of throughput is obtained, however the energy consumed is maximum. If a method that only adapts the duration of a single presence period between two Beacons is considered (line B), a good performance in terms of energy can be obtained but throughput can be severely degraded. If, however, both duration and interval of the presence periods are adapted, a close to optimal trade-off between connection's throughput and energy consumption in the Wi-Fi AP can be obtained (lines C and D).

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a wireless terminal as an access point—access point terminal—that connects a set of one or more client terminals to an external network comprising:
    establishing a schedule of absence periods, wherein during said absence periods connected client terminals are not allowed to transmit data to said access point terminal,
    scheduling the absence periods together with corresponding presence periods at regular intervals to have certain durations, and
    executing an adaptation of the absence/presence periods' duration and/or interval parameters on the basis of bandwidth available in said external network and an amount of traffic transmitted between said access point terminal and said connected client terminals,
    wherein the adaptation of the absence/presence periods' duration and/or interval parameters takes into consideration a percentage of bandwidth available in said external network that said access point terminal is willing to provide to said connected client terminals.

2. The method according to claim 1, wherein said access point terminal is operated as a Wi-Fi access point.

3. The method according to claim 1, wherein said access point terminal is a mobile phone, and wherein said external network is a wide area network, in particular a 3G network, a WiMAX network, or an LTE network.

4. The method according to claim 1, wherein said schedule of absence/presence periods is established in form of the Wi-Fi Direct Notice of Absence power saving protocol.

5. The method according to claim 1, wherein said access point terminal is configured to advertise a schedule of absence/presence periods that is defined at least by the duration and the interval of absence/presence periods.

6. The method according to claim 1, wherein said access point terminal is configured to measure the bandwidth available in said external network.

7. The method according to claim 1, wherein the bandwidth in said external network is measured using an interface between said access point terminal's external network driver and said access point terminal's driver for the communication with said connected client terminals.

8. The method according to claim 1, wherein the bandwidth in said external network is measured using active and/or passive measurement algorithms, in particular by sending probe packets or measuring interarrival times between packets.

9. The method according to claim 1, wherein said access point terminal is configured to measure the amount of traffic forwarded between said external network and said connected client terminals.

10. The method according to claim 1, wherein the duration of said access point terminal's presence periods is increased and/or the duration of its absence periods is decreased in case the amount of traffic forwarded between said access point terminal and said connected client terminals is below a predetermined amount of the bandwidth available in said external network.

11. The method according to claim 1, wherein the duration of said access point terminal's presence periods is decreased and/or the duration of its absence periods is increased in case the amount of traffic forwarded between said access point terminal and said connected client terminals is reasonably close to or above a predetermined amount of the bandwidth available in said external network.

12. The method according to claim 1, wherein the interval between said access point terminal's absence/presence periods is decreased in case the amount of traffic forwarded between said access point terminal and said connected client terminals is below a predetermined amount of the bandwidth available in said external network.

13. The method according to claim 1, wherein the interval between said access point terminal's absence/presence periods is increased in case the amount of traffic forwarded between said access point terminal and said connected client terminals is reasonably close to or above a predetermined amount of the bandwidth available in said external network.

14. The method according to claim 1, wherein said access point terminal is configured to establish an adapted power saving schedule in case applications do not offer enough traffic to reach the predetermined amount of bandwidth available in said external network.

15. The method according to claim 1, wherein the adaptation of the absence/presence periods' duration and/or interval parameters takes into consideration the amount of battery power left said access point terminal.

16. A wireless terminal comprising:

said terminal being operated as an access point—access point terminal—that connects a set of one or more client terminals to an external network, wherein:

said access point terminal is enabled to establish a schedule of absence periods during which said connected client terminals are not allowed to transmit data to said access point terminal, the absence periods together with corresponding presence periods are scheduled at regular intervals and have certain durations, said access point terminal is configured to execute an adaptation of the absence/presence periods' duration and/or interval parameters on the basis of the bandwidth available in said external network and the amount of traffic transmitted between said access point terminal and said connected client terminals, and in the adaptation of the absence/presence periods' duration and/or interval parameters, the access point terminal takes into consideration a percentage of bandwidth available in said external network that said access point terminal is willing to provide to said connected client terminals.

* * * * *